US011907935B2

(12) United States Patent
Pogorelik et al.

(10) Patent No.: US 11,907,935 B2
(45) Date of Patent: Feb. 20, 2024

(54) REDUCING BLOCKCHAIN TRANSACTION DELAY

(71) Applicant: INTEL CORPORATION, Santa Clara, CA (US)

(72) Inventors: Oleg Pogorelik, Lapid (IL); Guy Itzhaki, Jerusalem (IL); Rami Burstein, Kiryat Mozkin (IL)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 17/464,223

(22) Filed: Sep. 1, 2021

(65) Prior Publication Data

US 2021/0398107 A1 Dec. 23, 2021

Related U.S. Application Data

(62) Division of application No. 16/221,861, filed on Dec. 17, 2018, now Pat. No. 11,127,000.

(51) Int. Cl.
*G06Q 20/36* (2012.01)
*G06F 16/182* (2019.01)
*H04L 9/06* (2006.01)
*H04L 9/32* (2006.01)
*G06Q 20/00* (2012.01)
*H04L 9/00* (2022.01)

(52) U.S. Cl.
CPC ..... *G06Q 20/3674* (2013.01); *G06F 16/1824* (2019.01); *G06F 16/1834* (2019.01); *G06Q 20/00* (2013.01); *H04L 9/0643* (2013.01); *H04L 9/3239* (2013.01); *H04L 9/3247* (2013.01); *H04L 9/3297* (2013.01); *H04L 9/50* (2022.05); *H04L 2209/56* (2013.01)

(58) Field of Classification Search
CPC ............ G06Q 20/3674; G06F 16/1824; G06F 16/1834; H04L 9/0643
See application file for complete search history.

(56) References Cited

U.S. PATENT DOCUMENTS

| 9,552,584 | B1 * | 1/2017 | Bierbaum | G06Q 20/3263 |
| 9,912,486 | B1 * | 3/2018 | Sharifi Mehr | H04L 9/3265 |
| 10,078,835 | B2 * | 9/2018 | Radu | G06Q 20/20 |
| 2007/0209073 | A1 * | 9/2007 | Corby | G06F 21/51 |
| | | | | 726/22 |
| 2010/0057791 | A1 * | 3/2010 | Schneider | G06F 16/13 |
| | | | | 711/E12.002 |
| 2018/0089655 | A1 * | 3/2018 | McDonald | G06Q 20/065 |
| 2018/0158043 | A1 * | 6/2018 | Noë | G06Q 20/20 |

FOREIGN PATENT DOCUMENTS

WO WO-2018130910 A1 * 7/2018

* cited by examiner

*Primary Examiner* — Scott C Anderson
(74) *Attorney, Agent, or Firm* — KDW Firm PLLC

(57) ABSTRACT

A system and method for reducing blockchain transaction delay are disclosed. The system consists of a trusted coin wallet framework that implements a trusted execution environment to initiate currency transactions between two clients. The trusted coin wallet framework includes an API proxy and a trusted shadow wallet. The method used by the trusted coin wallet framework involves interaction between the trusted shadow wallet and a peer trusted wallet owned by the other client, via the API proxy, from within the trusted execution environment. During these operations, the blockchain infrastructure is independently validating the transaction.

4 Claims, 16 Drawing Sheets

REDUCING BLOCKCHAIN TRANSACTION DELAY

CROSS-REFERENCE TO RELATED APPLICATIONS

This application is a division of, claims the benefit of and priority to previously filed U.S. patent application Ser. No. 16/221,861 filed Dec. 17, 2018, entitled "REDUCING BLOCKCHAIN TRANSACTION DELAY", which is incorporated herein by reference in its entirety.

TECHNICAL FIELD

This application relates to blockchain technology and, more particularly, to transactions involving digital currency exchange between clients.

BACKGROUND

Blockchain is a technology that originated in the cryptocurrency realm, but its usage may extend to many other arenas, from quality assurance to supply chain and financial sectors. Blockchain consists of a distributed ledger, which is essentially a database located on disparate nodes. In general, the ledger is a series of sequential blocks. Each node maintains a copy of the distributed ledger, ensuring data integrity, auditability, redundancy, and so on.

The blocks making up the distributed ledger each contain records, also known as operations or transactions. The transactions are not distributed by a central authority but are instead constructed by the nodes. In general, transactions are entered in the ledger after being validated or "accepted" by a specified number of nodes. Thus, each node can independently build the ledger from validated transactions, such that all nodes arrive at the same ledger. The cost of trust in the contents of the ledger, traditionally provided by attorneys, bankers, notaries, and so on, is avoided with blockchain technology. Thus, blockchains make good platforms for "smart contracts" between two entities wanting to exchange goods or services.

By design, there exists a delay before trust is established over a smart contract negotiated between two entities, for example, the time for a number of nodes to accept or validate the transaction. This delay may frustrate some contractual relationships between the entities.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a system and method for reducing blockchain transaction delay are disclosed. The system consists of a trusted coin wallet framework that implements a trusted execution environment to envelop an original wallet owned by a client (buyer/payor) used to initiate currency transactions with another client (seller/payee). The trusted coin wallet framework includes an API proxy and a trusted shadow wallet. The method used by the trusted coin wallet framework involves interaction between the trusted shadow wallet and a peer trusted wallet owned by the other client, via the API proxy, from within the trusted execution environment. During these operations, the blockchain infrastructure is independently validating the transaction.

Although the phrase "trusted coin wallet framework" includes the term, "coin", this disclosure is not limited to blockchains used to transact in digital currency or "coins". Instead, the system and method for reducing blockchain transaction delay disclosed herein may be implemented for other transaction types besides digital currency. For example, the trusted coin wallet framework may be used to validate digital contracts or transfer title in other assets, either real or digital.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. In other instances, well-known structures, materials, or operations are not shown or described in detail to avoid obscuring aspects of the disclosure. The following detailed description is, therefore, not to be construed in a limiting sense, as the scope of the subject matter is defined by the claims.

Introductory FIGS. 1-4 provide context for the system and method for reducing blockchain transaction delay described herein, which are introduced in FIG. 5 and further described and illustrated in FIGS. 6-13, below.

Figure 1:
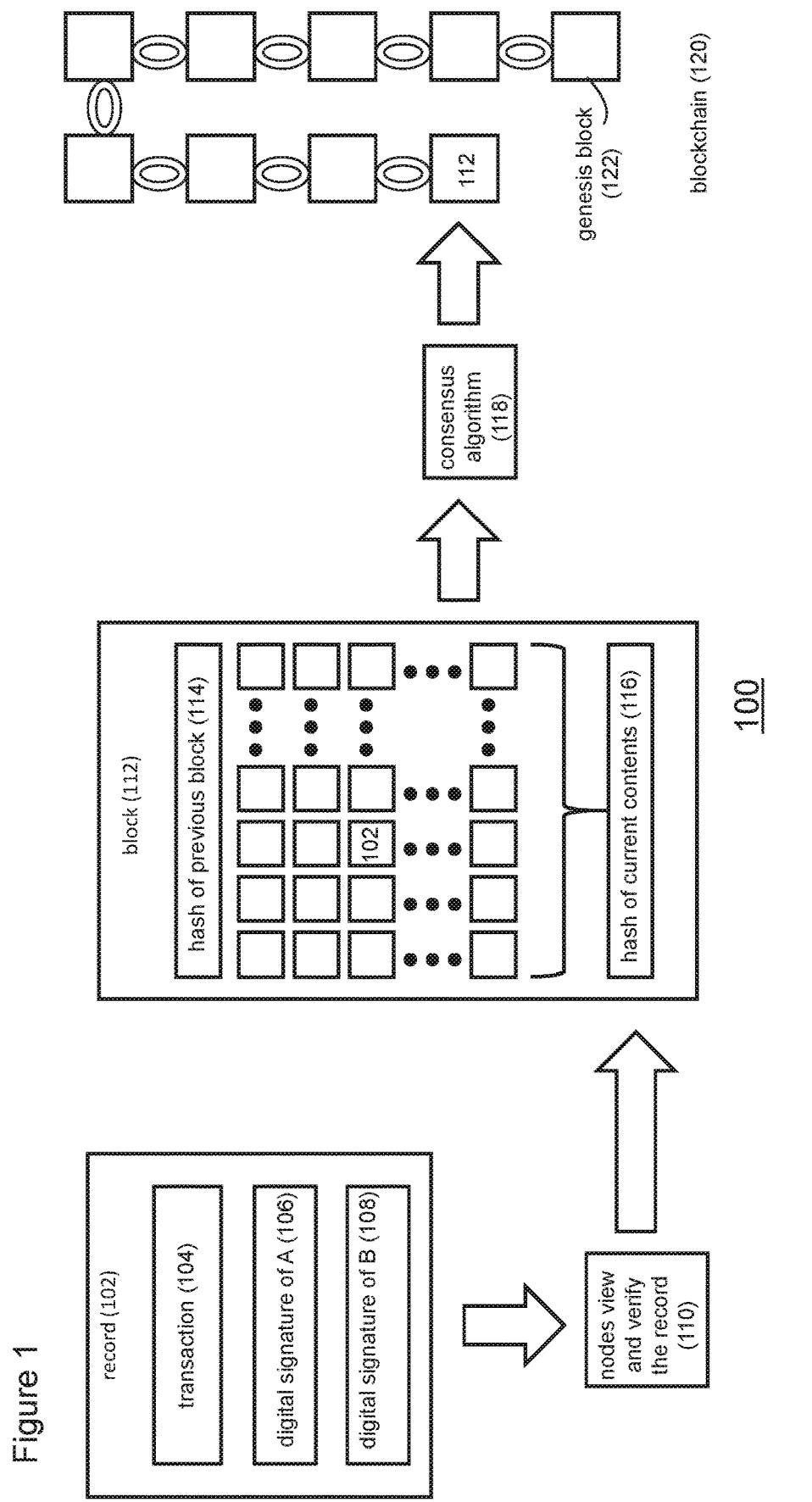
FIG. 1 is a schematic block diagram of an exemplary system to store records in a blockchain, in accordance with some embodiments.

FIG. 1 is a schematic block diagram of an exemplary system 100, according to some embodiments, for adding a record to a blockchain. A record 102 consists of a transaction 104, which may be any of a variety of agreements made between two parties, given as parties A and B. The record 102 also includes a digital signature of party A 106 and a digital signature of party B 108. The digital signatures 106 and 108 are also known as private keys. Thus, party A has her own private key that is not known to others using the system 100, and, likewise, party B has his own private key, also not known to others. The transaction 104 may include, but is not limited to, a transfer of digital currency (also known herein as cryptocurrency, virtual currency, or just currency), such as in payment for a good or service, a contract between parties A and B, and so on. Each record 102 of the system 100 includes the transaction 104 and the digital signatures 106 and 108 of parties A and B, respectively.

The P2P network of nodes independently view and verify 110 the record 102 containing the transaction 104 between parties A and B before the record, and thus the transaction, can become part of a blockchain 120. The way in which the nodes perform this view and verification operation 110 is beyond the scope of this disclosure and may vary, depending on the application of the blockchain 120. Once nodes confirm the veracity of the record 102, the record becomes part of a collection of records in a block 112. In addition to the plurality of records 102, the block 112 also contains a hash of a previous block 114 of the blockchain 120, as well as a hash of the current contents 116 of the block. Any change to the contents of the block 112 would cause the hash 116 to change. This is designed to protect the record 102 inside the block 112, and thus the transaction 104 inside the record.

Before becoming part of the blockchain 120, the block 112 is subjected to a consensus algorithm 118. For the cryptocurrency bitcoin, which uses blockchain technology, the consensus algorithm is known as proof of work, which uses complex mathematical operations performed by mining nodes. There exist many other types of consensus algorithms, such as proof of stake, proof of elapsed time (PoET), proof of authority (PoA), proof of capacity, proof of activity, proof of burn, delegated proof of stake (DPoS), byzantine fault tolerance, proof of importance, and direct acyclic graphs (DAGs). In the case of bitcoin, the proof of work slows down the acceptance of the block into the blockchain. Once the block 112 passes the consensus algorithm 118 by a majority of nodes, the block is added to the blockchain 120.

A genesis block 122 does not include a hash of the previous block, but other blocks of the blockchain 120 do include the hash linking the block to the previous block. The combination of these linking hashes and the consensus algorithm help to make the blockchain secure.

Figure 2:
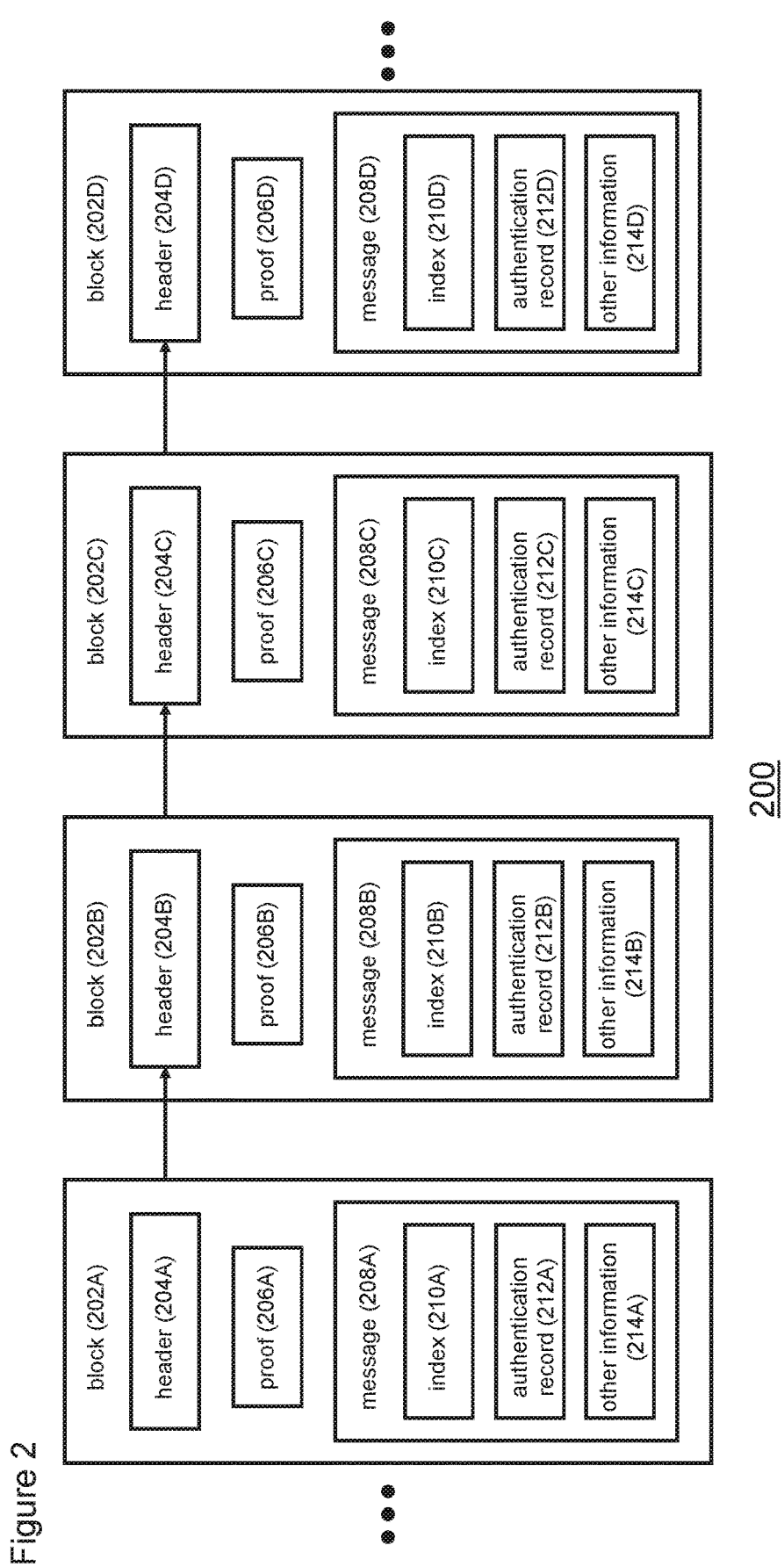
FIG. 2 a second view of a blockchain, in accordance with some embodiments.

FIG. 2 is another view of a blockchain 200, according to some embodiments. The blockchain 200 consists of a plurality of blocks 202A-202D (collectively, "blocks 202"), each of which include respective headers 204A-204D (collectively, "headers"), proofs 206A-206D (collectively, "proofs 206"), and messages 208A-208D (collectively, "messages 208"). Messages 208 further respectively include indexes 210A-210D (collectively, "indexes 210"), authentication records 212A-212D (collectively, "authentication records 212"), and other information 214A-214D (collectively, "other information 214").

Respective headers 204 identify each block 202 as distinct from another block. The headers 202 may include a hash value generated by a hash function. A hash function is any function that can be used to map input data of arbitrary size to a hash value of a fixed size. Thus, the hash of the previous block 114 and the hash of current contents 116 in the block 112 of FIG. 1 are the same length. As one example, in FIG. 2, the header 204B of block 202B may include the hash of the block 202A as well as a hash of the message 208B within its own block (such as a Merkel root), and a timestamp.

As described with respect to FIG. 1, blocks to be added to a blockchain satisfy a consensus algorithm. In the example of FIG. 2, each block 202 includes a respective proof 206, short for proof of work. Further, in some embodiments, the headers 204 of respective blocks 202 include a nonce chosen to ensure the header satisfies the proof of work condition. The proof of work condition may be satisfied once the hash of the header falls within a predetermined range of values, as one example. Or, the header may be digitally signed within a cryptographic key of an authorized user, with the digital signature being included in the header.

The messages 208 of respective blocks 202 may include index information 210, authentication information 212, and other information 214. Index information 210 may include non-sensitive information, such as a user's name, phone number, and email address, for example. Reference to other blocks in the blockchain (or the hash of the block), such as those associated with the same user, may also be part of the index information. The index information may be encrypted or otherwise obfuscated so as to limit who is able to view the index information 210. Or the index information may include a hash of the user's personal information (e.g., name, phone number, email address).

In some embodiments, the messages 208 of respective blocks 202 also includes an authentication record 212. The authentication record 212 may include information that enables subsequent auditing of transactions. Suppose, for example, the blockchain 200 is a private blockchain accessible only to a select group, such as a stock exchange. The authentication record may identify a computing system that is allowed access to the blockchain 200. The authentication record 212 may also identify a purpose of an authentication request, such as the creation of a relationship, such as a brokerage relationship, with the stock exchange. The authentication record 212 may also include a result of an authentication request, such as whether the purpose of the authentication request was achieved. The authentication record 212 may also include information related to the authentication request, such as additional contact information, financial information, demographic information, and so on, associated with the authentication request. Like the index information 210, the authentication information 212 may be encrypted, such as with a cryptographic key. Other information 214 not heretofore described may also be part of respective messages 208 of blocks 202.

Cryptographic keys may be used to encrypt elements of the blocks 202, including the messages 208. Cryptographic keys may be associated with an authorized user or system, for example. Corresponding cryptographic keys may enable decryption of the encrypted message elements. For example, the message in a block may be encrypted with a symmetric key, and the same symmetric key may be available for decrypting the encrypted element. Or, the message may be encrypted with a private key while a corresponding public key is used to decrypt the encrypted message.

Figure 3:
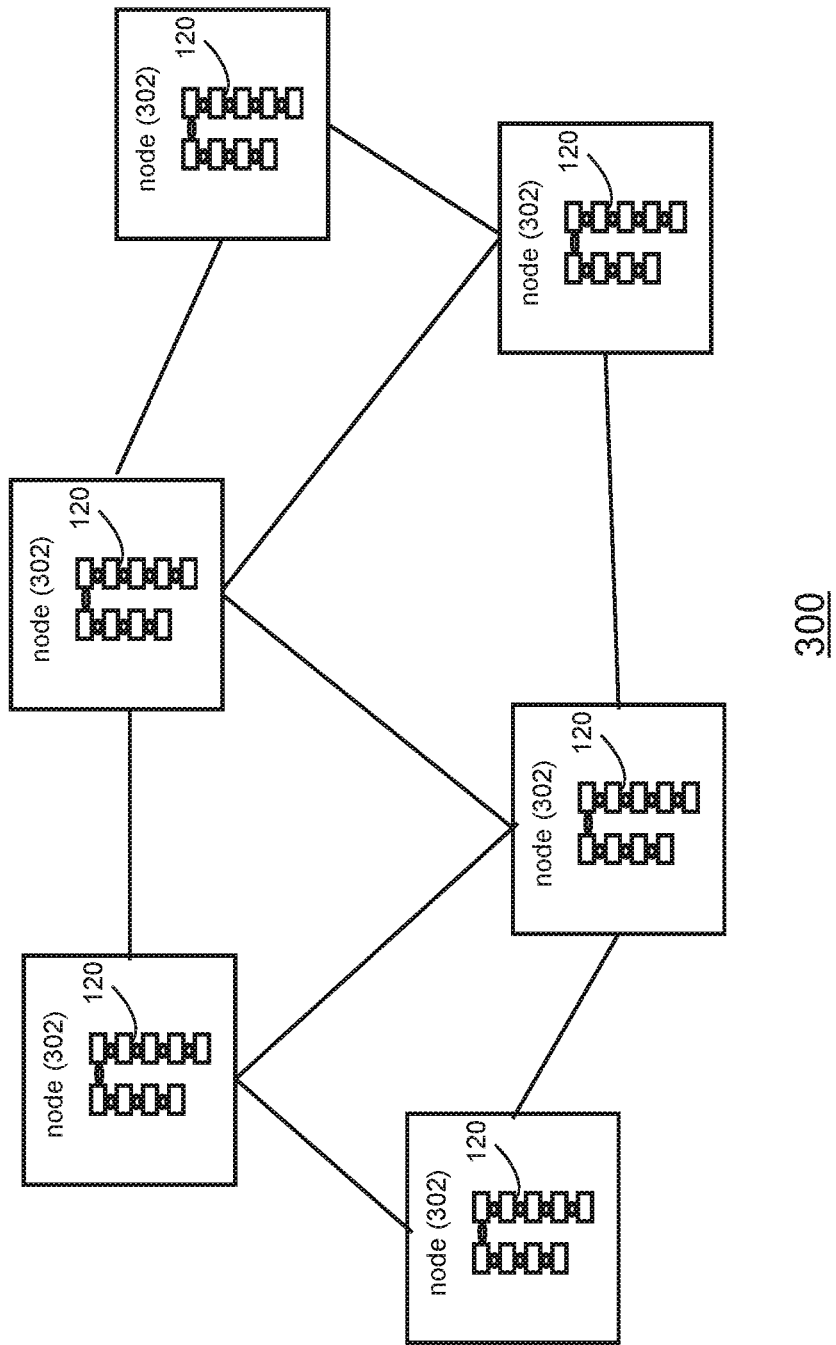
FIG. 3 is a simplified diagram of the blockchain infrastructure, in accordance with some embodiments.

FIG. 3 is a simplified diagram of the blockchain infrastructure, also known herein as a node network 300, according to some embodiments. As described above, the network 300 consists of a plurality of nodes 302, each of which include a copy of the blockchain 120 (FIG. 1). The nodes 302 consist of computing devices, such as servers, workstations, or special-purpose computing devices. The nodes 302 are interconnected and may be part of a communications network, such as the Internet, or a private network, such as a local area network, and so on. The blockchain 120 is thus a distributed database or distributed ledger of all the transactions stored inside its blocks.

Figure 4:
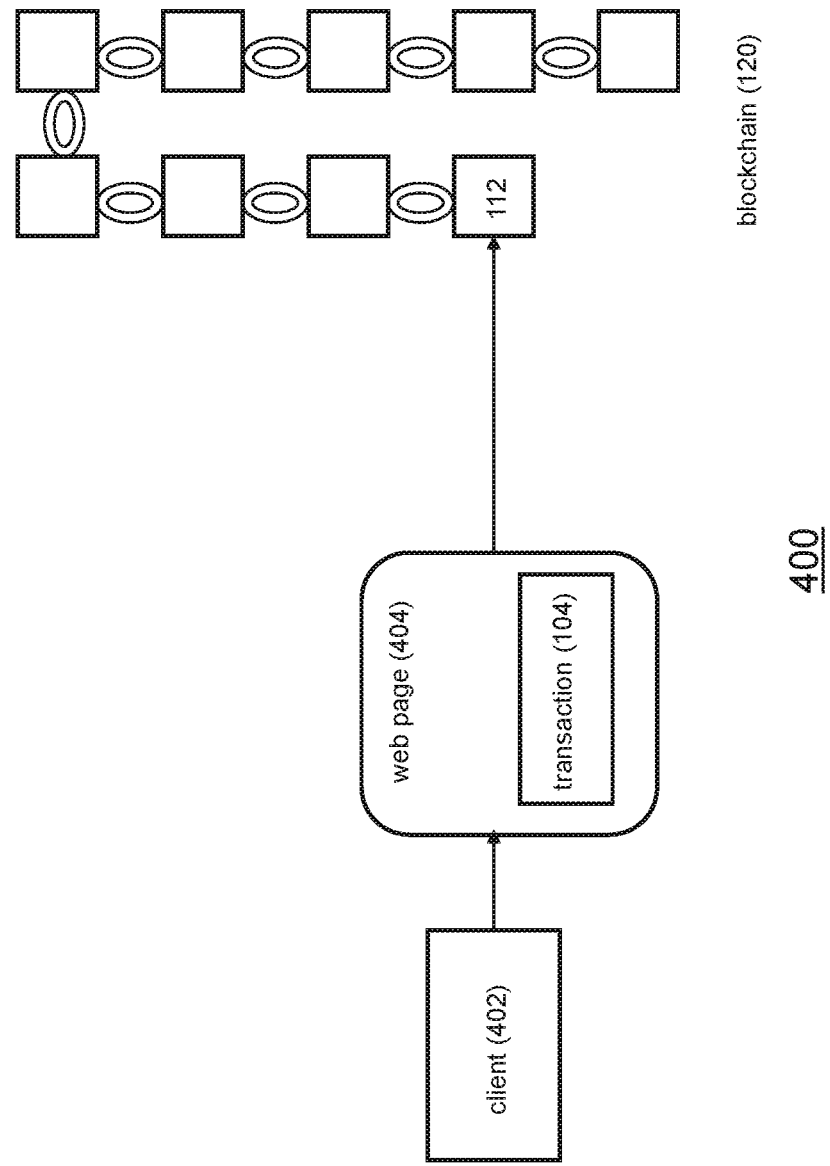
FIG. 4 is a simplified diagram of a system in which a client initiates a transaction, in accordance with some embodiments.

FIG. 4 is a simplified diagram of a system 400 in which a client initiates a transaction, according to some embodiments. A client 402, such as a human user, would like to engage in a transaction with another person (not shown). The client 402 may have access, via a cellphone, tablet, laptop computer, and so on, to a web page 404 or other graphical user interface (GUI), upon which software is loaded. Alternatively, the client 402 may access the GUI from an application on her cellphone. The GUI enables the client 402 to initiate a transaction such as the transaction 104 (FIG. 1). The transaction may be for example, a transfer of bitcoins to another client in exchange for a good or service being performed by the other client on behalf of the client 402. The record containing the transaction ends up on the blockchain 120, such as is illustrated in FIG. 1. The client 402 is generally unaware of the role the blockchain, or more specifically the nodes, in confirming the veracity of the transaction between the client and the other client.

Figure 5:
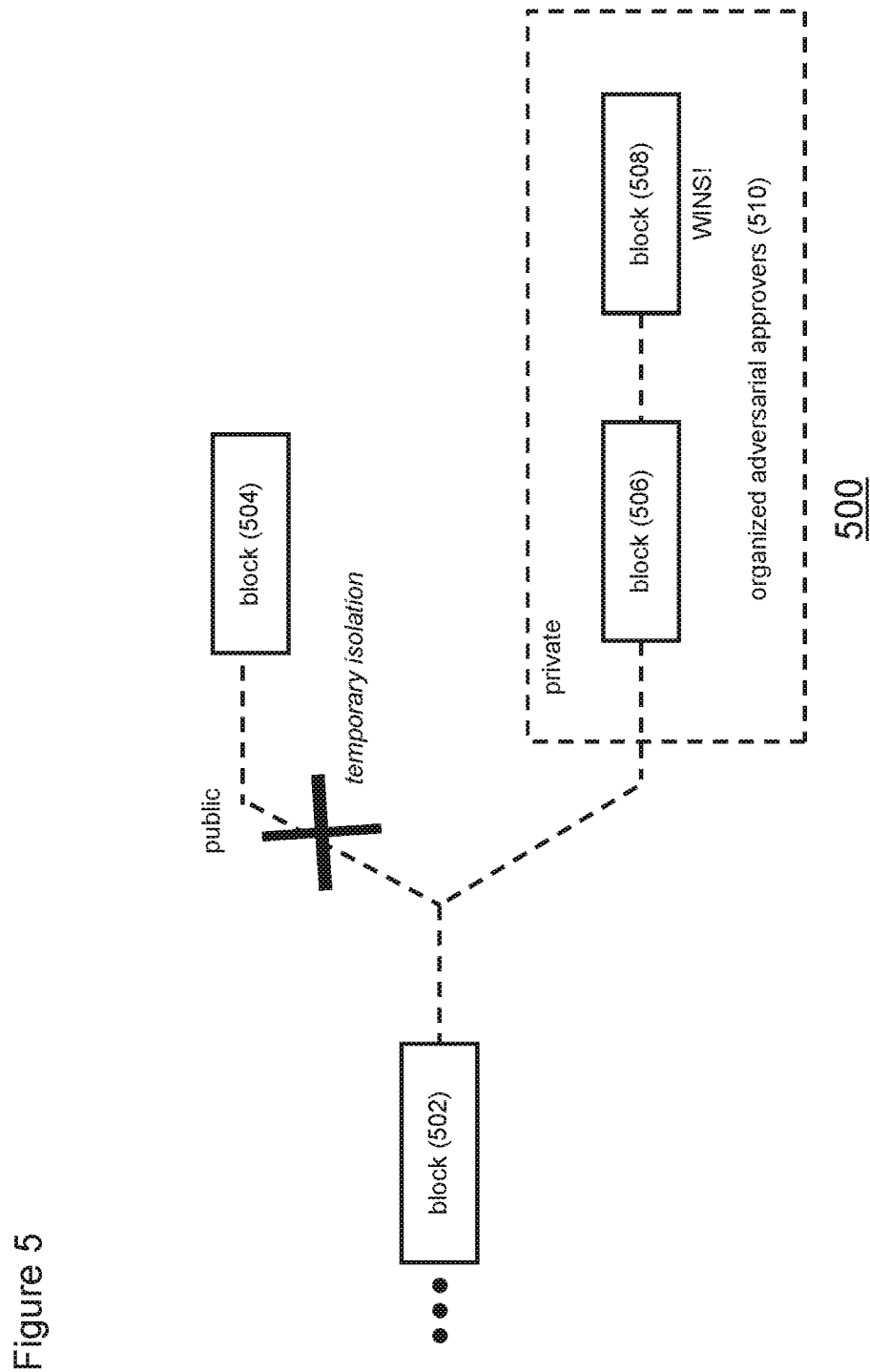
FIG. 5 is a simplified block diagram illustrating a forking attack on a blockchain infrastructure, according to some embodiments.

FIG. 5 is a simplified block diagram illustrating a forking attack on a blockchain infrastructure 500, according to some embodiments. Current blockchain infrastructure has a built-in algorithm-induced delay used for protecting against attacks based on so-called forking. Forking is a technique in which a group of approvers is isolated, with the goal to block disapprovals coming from a crowd when a malicious user tries to use fake money in a transaction. This malicious type of forking is distinguishable from hard and soft forks, which are mechanisms by which developers make software updates to add new features or fix bugs, among other tasks.

Using a bitcoin transaction as an example, suppose individual A has ten bitcoins to spend, and offers one bitcoin to individual B to buy a cup of coffee from individual B. (In this example, the actual value of a bitcoin may be ignored.) From FIG. 1, the transaction 104 in which a bitcoin is transferred from individual A to individual B becomes part of a record 102, is verified 110, and becomes one of several records in a block 112. (Another transaction, in which individual A only has 9 bitcoins left, is also recorded.) Once a consensus algorithm, such as proof of work, is solved by one of the nodes (e.g., as in the node network 300 of FIG. 3), the block 112 becomes part of the blockchain 120.

Looking at FIG. 5, the block 502 is the end block of the blockchain 500 and the record containing the transaction between individuals A and B may become part of a new block 504, that is, once the consensus algorithm is solved. Further records of transactions between entities may become part of a new block, and that would be expected to attach to the block 504.

Suppose instead, however, that individual A is part of a group of organized adversarial approvers 510, in other words, fraudulent nodes. Individual A wants to respend the bitcoin just sent to individual B, which is now part of the block 504. That is, individual A wants to engage in a fraudulent transaction. To do so, individual A initiates a new transaction in which that same bitcoin owned by individual A and already sent to individual B is sent to individual C. One method for individual A to do this it to control a number of nodes in the network sufficient to temporarily isolate block 504 from being confirmed. The new transaction where individual A transfers to individual C is recorded in a new block, 506. The new block 506 is also temporarily isolated from the whole network and maintained privately by the group of nodes controlled by individual A. This group of nodes is used to confirm the transactions in block 506. Disconnecting several nodes from the network may be one method of making the behavior of the malicious attackers private. If the organized adversarial approvers 510 have enough computing power to calculate the proof of work or other consensus algorithm, on the block 506, they can then add a new block 508 also filled with transactions, calculate the consensus algorithm, and then get block 508 also added to the blockchain 500. There are now two forks in the blockchain 500, one containing the legitimate block 504 and the other containing the fraudulent blocks 506 and 508. Because the longest block in a fork actually wins, the isolation of block 504 loses out to the blocks 506 and 508. Although blockchains such as bitcoin are robust enough to make such fraudulent forking unlikely, the presence of well-organized adversarial approvers 510 with significant computing power and the ability to isolate the legitimate block 504, may enable the fraudulent bitcoin transaction from individual A to individual C to succeed.

In blockchains such as bitcoin, it takes on average about ten minutes for a node to approve the block. As a practical matter, a transaction is not truly trusted until the block containing the transaction is succeeded by one or two successor blocks in the blockchain. Thus, blockchain is often plagued by long transaction delays (minutes or even hours). Further complicating this is that the delay to confirm transactions may be longer for smaller transactions. For example, when a node generates a block it is allowed to select which transactions to include in the block and will often select larger transactions to include first. Thus, smaller transactions may involve significantly longer periods of time (e.g., hours or days) to confirm.

Long transaction latency makes virtual currency impractical in transactions in which fast approval is desired. Examples include stock exchange operations and physical shopping in which both sides of the transaction do not want to wait several minutes for transaction approval.

Suppose a person owns a coffee shop and she allows patrons to pay for coffee with bitcoin. She may accept a bitcoin offer from person D who enters her shop without waiting the ten minutes necessary to ensure the transaction is not fraudulent. Same with persons E, F, and G. The shop owner has decided that the risk of accepting fraudulent bitcoin transactions is worth it, given that she will have a good volume of customers over the course of the day. At the end of the day, maybe two or three of those transactions will prove to be fraudulent, but, in comparison to the traffic of customers who patronized her shop, such risk is acceptable.

Suppose another person owns a car dealership where bitcoins are useable for payment. Now, the risk of fraudulent bitcoin transactions is not worth the risk, and so the owner of the car dealership will accept the transaction delay to ensure each bitcoin transaction is secure. In such circumstances, third party insurance may be used to ensure that the transfer of bitcoin for the purchase of a car is legitimate.

Thus, the use of virtual currencies is limited to operations between entities, whether virtual, remote, etc., where the entities can wait. As in the coffee shop example, there are some sellers taking risks of releasing the product/service before approval from the virtual currency blockchain is provided. And, there are a number of insurance companies covering the risks, particularly in higher dollar transactions than those used to buy coffee. The presence of insurance to secure these transactions inevitably drives up the cost of the transaction.

Figure 6:
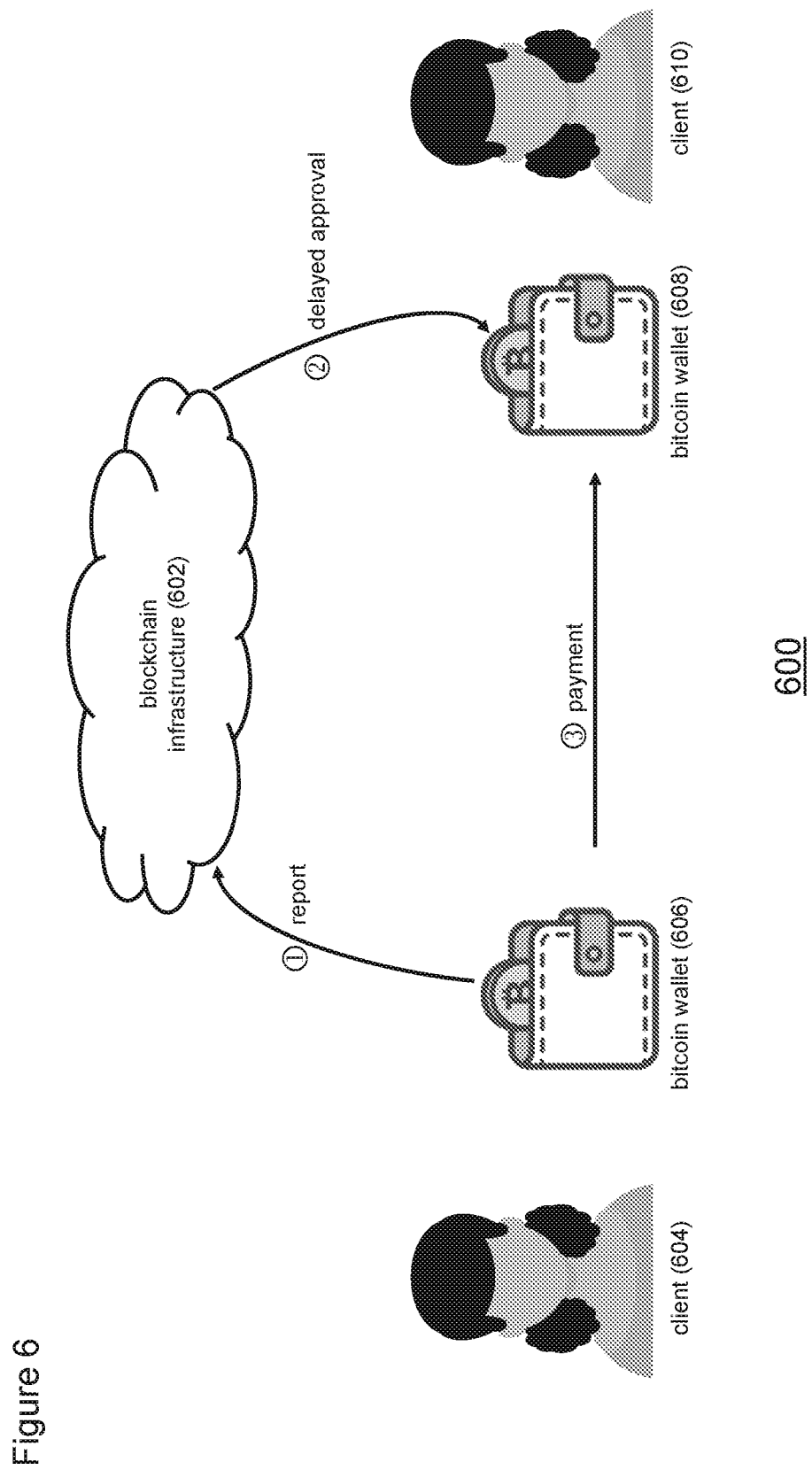
FIG. 6 is a schematic block diagram showing the current method for transferring a bitcoin between entities, according to some embodiments.

FIG. 6 is a schematic block diagram showing the current method 600 for transferring a bitcoin between entities, according to some embodiments. In this example 600, a transaction, such as a transfer of bitcoins, is to take place between a client 604, who is in possession of bitcoin wallet 606, and a client 610, who is in possession of bitcoin wallet 608. For the transaction to take place, the client 604 (also known as a user or person sends a report to the blockchain infrastructure 602, which includes the transaction request (1). The transaction request, as described above, may be for purchasing a cup of coffee by the client 604 from client 610, as one example.

As described above, the blockchain infrastructure 602 includes a bunch of nodes that view and verify the transaction, as well some nodes that solve the consensus algorithm. After some period of time, a delayed approval occurs (2), after which, a payment of bitcoin between bitcoin wallet 606 and bitcoin wallet 608 occurs (3). The method 600 in FIG. 6 thus illustrates the transaction delay that occurs with virtual currency.

Figure 7:
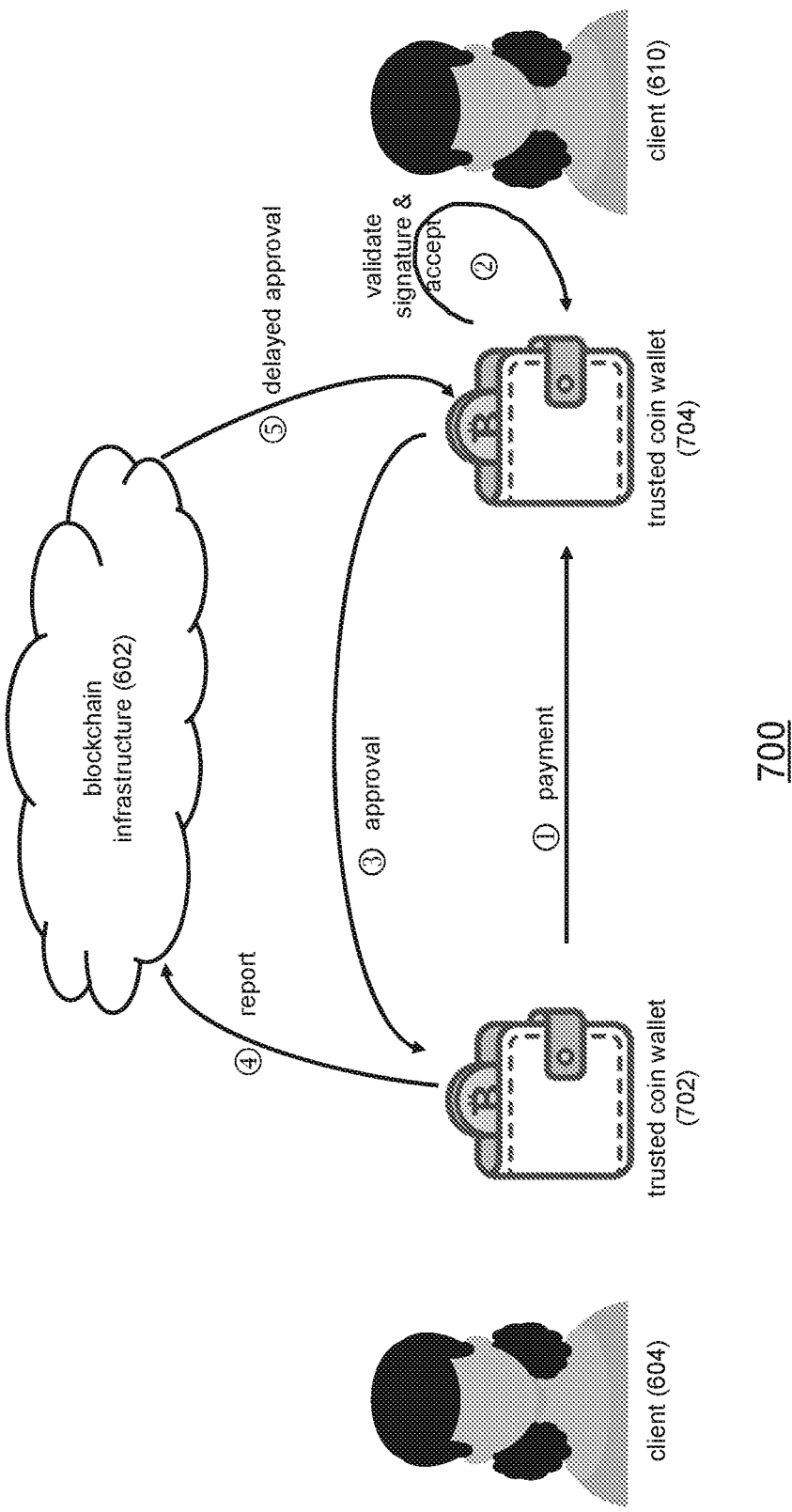
FIG. 7 is a schematic block diagram of a method for reducing blockchain transaction delay, according to some embodiments.

FIG. 7 is a schematic block diagram of a method for reducing blockchain transaction delay 700, according to some embodiments. The method 700 allows fast blockchain-based transactions without exposing both payor (buyer) and payee (seller) to the risks of being fooled by a fraudulent transaction. As in FIG. 6, the method 700 features the blockchain infrastructure 602 as well as the clients 604 and 610. Additionally, the method 700 relies on a trusted coin wallet (TCW), which leverages trusted hardware to create trust for the exiting wallet keeping account information. In the example of FIG. 7, the client 604 (payor/buyer) has a TCW 702 and the client 610 (payee/seller) has a TCW 704. In some embodiments, the trusted hardware of the trusted coin wallets provides an alternative for blockchain-based approval for the period of delay until the regular blockchain approval occurs.

Looking at the method 700, the payor client 604 uses her TCW 702 to make a payment to the TCW 704 of the payee client 610 (1). The TCW 704 of the payee client 610 validates the signature and accepts the payment (2). An approval is sent from the payee TCW 704 to the payor TCW 702 (3). A report of the transaction between clients 604 and 610 is sent to the blockchain infrastructure 602, with the approval of the transaction being made by the nodes as described above (4). After some period of time, a delayed approval occurs (5).

In some embodiments, the method for reducing blockchain transaction delay 700 allows trusted wallets to communicate with one another to confirm the transaction and update accounts reliably and securely. As will be shown, infrastructure is synchronized so that, if one of the wallets does not include the trusted hardware, existing infrastructure is still available to ensure trust in the transaction. In some embodiments, the transaction exchange illustrated in FIG. 7 will take milliseconds, enabling the payee to release her product or service in a timely manner, rather than having to wait for delayed confirmation as in original blockchain transactions. Further, the trust level that users of blockchain have come to expect is maintained using the method 700, in some embodiments.

Figure 8:
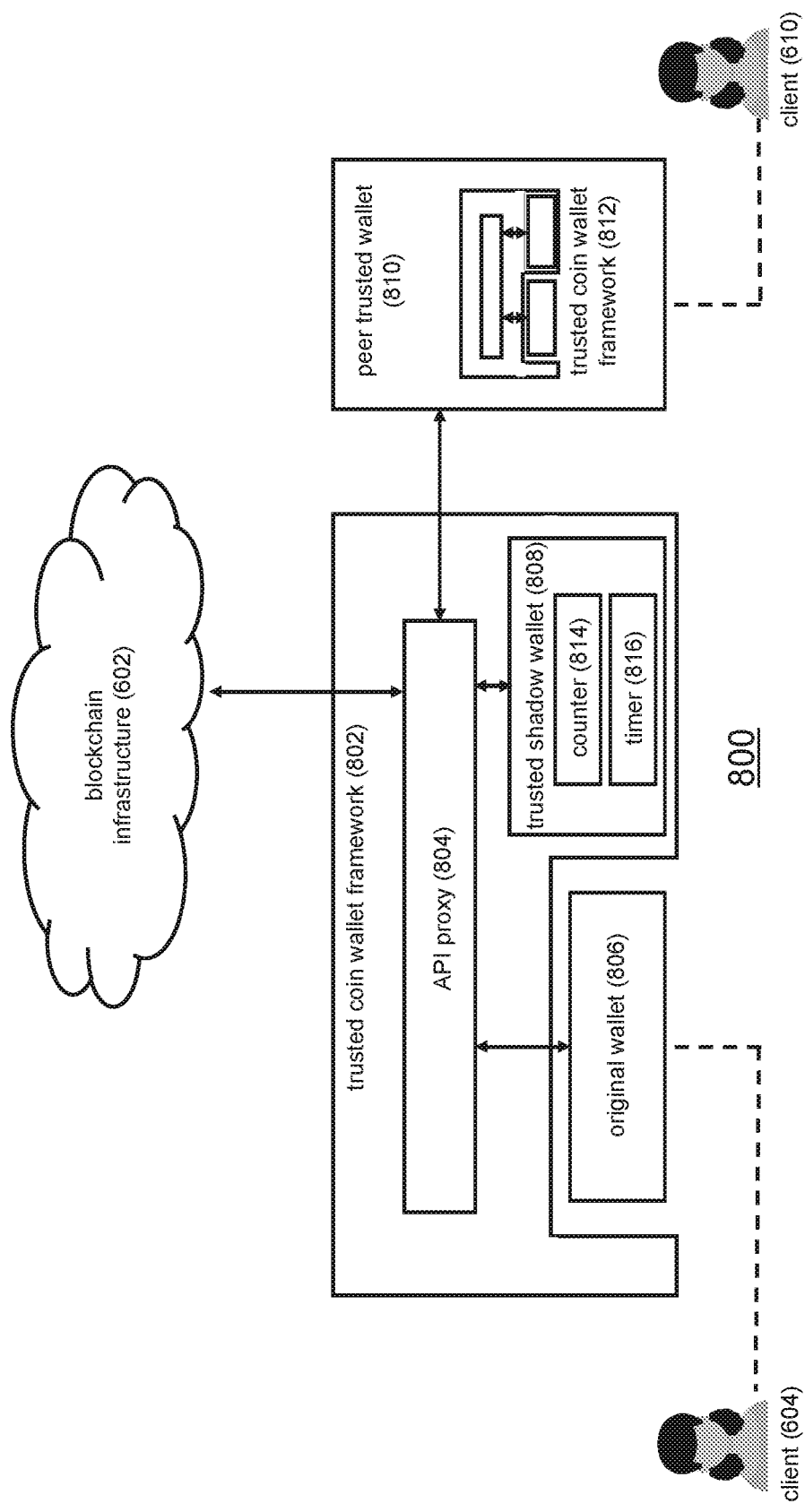
FIG. 8 is a simplified block diagram of a system for reducing blockchain transaction delay, according to some embodiments.

FIG. 8 is a simplified block diagram of a system for reducing blockchain transaction delay 800, according to some embodiments. The system 800 implements a trusted hardware wallet architecture, which includes a trusted coin wallet framework 802, an application programming interface (API) proxy 804, and a trusted shadow wallet 808. The trusted coin wallet framework 802 is a framework installed on top of an original wallet 806, also known as a digital asset wallet, such as the bitcoin wallet 606 of the client 604 (FIG. 6), transforming it into a trusted coin wallet, such as the trusted coin wallet 702 (FIG. 7).

The trusted coin wallet framework 802 is part of a trusted execution environment (TEE), such as Intel® Software Guard Extensions (SGX). A TEE provides hardware-assisted security to the system by taking sensitive parts of an application and allowing the application to be run from within CPU-hardened enclaves. These enclaves are isolated environments or private regions of memory which are secured from being accessible by programs and applications running on the platform, including the operating system.

The trusted coin wallet is shown enveloping the original wallet or digital asset wallet 806 in FIG. 8. In some embodiments, the envelopment, or "isolation", is implemented either as a run-time or manufacturing time binding of a pluggable unified wallet component. After being sealed, the original wallet 806 is interfaced through the API proxy 804 of the trusted coin wallet framework 802, which are inside the TEE. An API (application programming interface) proxy is a façade that is put in front of an API such that applications call the proxy directly and the proxy calls the API. Likewise the API calls the proxy and the proxy interfaces with the application. Thus, the API proxy is an intermediary between the application and the API. The API proxy enables access to precoded solutions to common interactions between the applications and the API.

In the system 800, the API proxy 804 of the trusted coin wallet framework 802 is the module responsible for redirection of the original (standard) communication messages to a peer trusted wallet 810 and/or to the blockchain infrastructure 602, in accordance to the operational flow illustrated in FIGS. 9A-9D and described in more detail below.

Also within the trusted coin wallet framework 802 and thus also inside the TEE, the trusted shadow wallet 808 is the module that maintains an equivalent account value of the original wallet 806. In other words, the shadow wallet 808 mimics the state of the original wallet 806. Accordingly, the trusted shadow wallet 808 includes a counter 814 to track the amount of currency in the wallet. The trusted shadow wallet 808 also includes a timer 816. In some embodiments, the timer is used for coping with the situation in which payment is not completed successfully on the recipient side, leading to an appropriate disapproval by the ledger. As a result, after some time period (in which the timer 816 expires), the blockchain will not "confirm" the payment and this will trigger a rollback on the payor side. Rollback will cause a reverse increment of the static counter (trusted money) managed by the shadow wallet, appropriate notification to the payor (and, optionally, to the payee), among other operations. Original transaction validation is a separate and independent set of operations not dependent on what is done from within the trusted coin wallet framework 802.

Further, in some embodiments, the trusted shadow wallet 808 ensures that the account value in the counter 814 is not modified by any adversarial entity, whether it be malware, a rogue user, and so on. Any transaction will go through approval versus the trusted shadow wallet 808 that will digitally sign the transaction and decrement the existing transaction amount after getting approval from the peer trusted wallet 810 or, after timeout, from the blockchain infrastructure 602. In some embodiments, the trusted shadow wallet 808 will run in the TEE and use hardware-based signing services, the details of which are beyond the scope of this disclosure.

The original wallet 806 is owned by the payor client 604 while the peer trusted wallet 810 is the possession of the payee client 610. In some embodiments, like the original wallet, the peer trusted wallet 810 is part of its own trusted coin wallet framework 812, with its own API proxy and trusted shadow wallet inside a TEE. In some embodiments, both the original wallet 806, enveloped as it is inside the trusted coin wallet framework 802 and the peer trusted wallet 810 will interact directly using an available interface, such as Bluetooth Low Energy (BLE), Near Field Communication (NFC), WiFi, and so on.

Figure 9A:
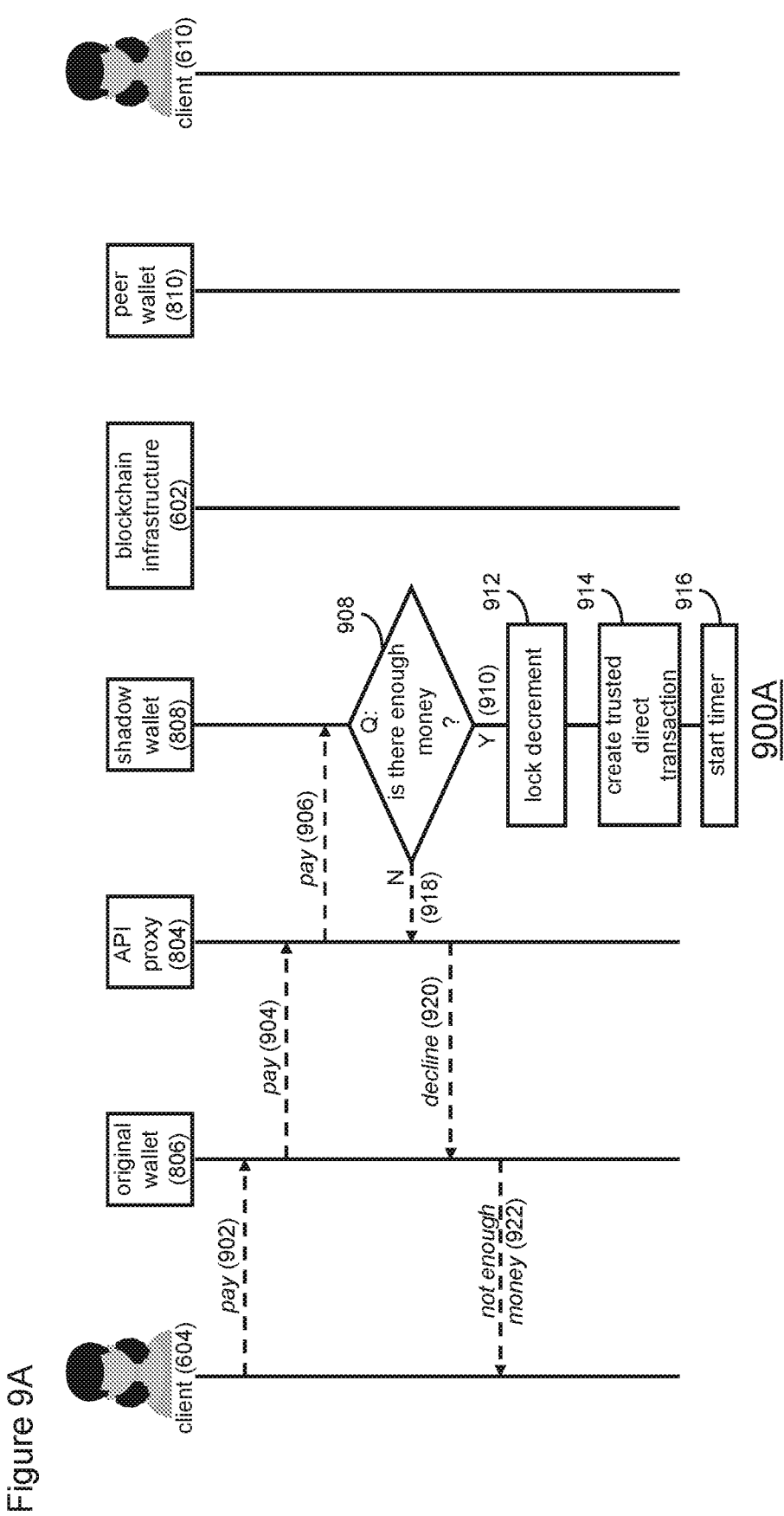
FIGS. 9A-9D provide a modified approval flow of the system for reducing blockchain transaction delay of FIG. 8, according to some embodiments.
Figure 9B:
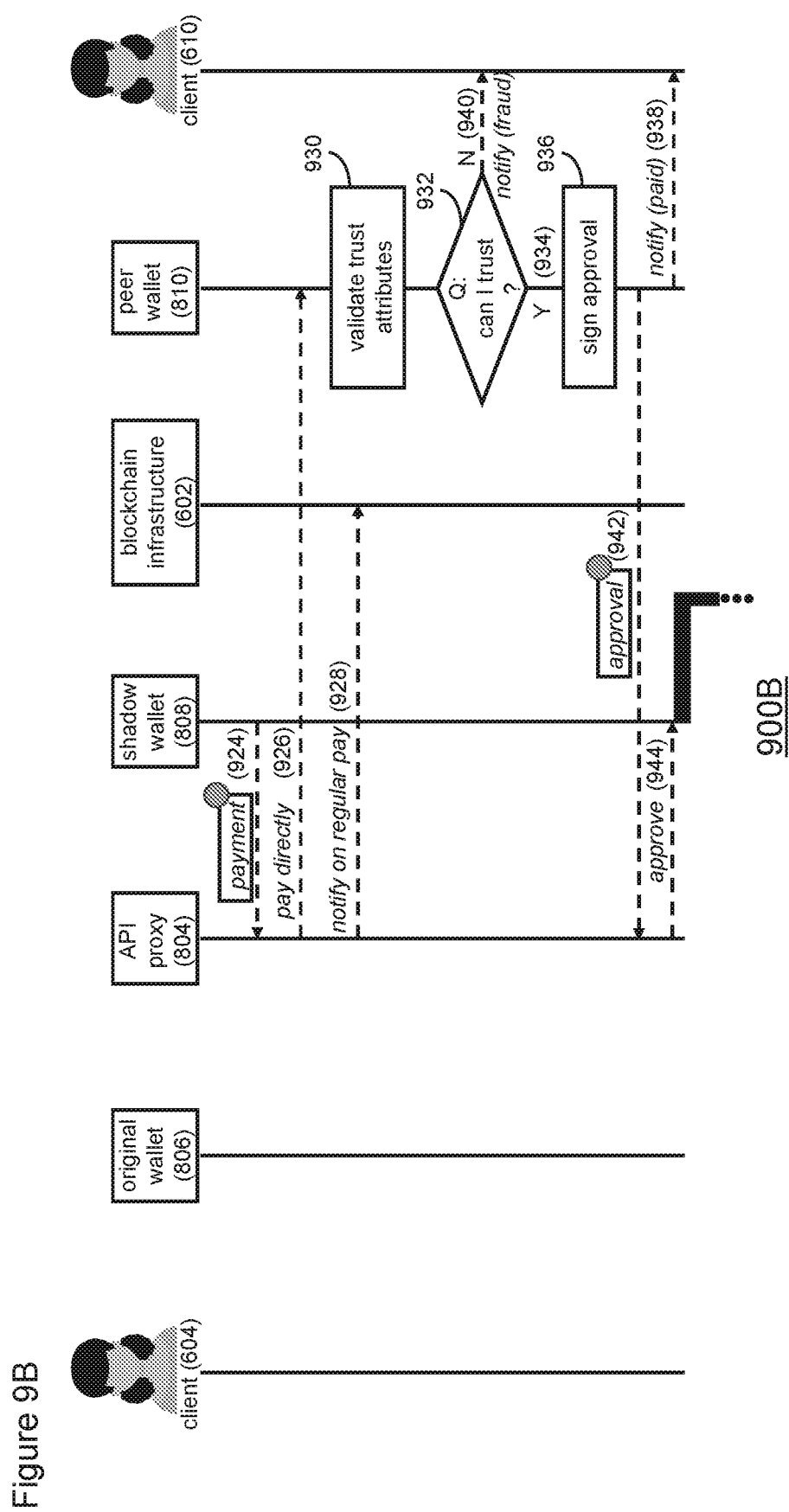
Figure 9C:
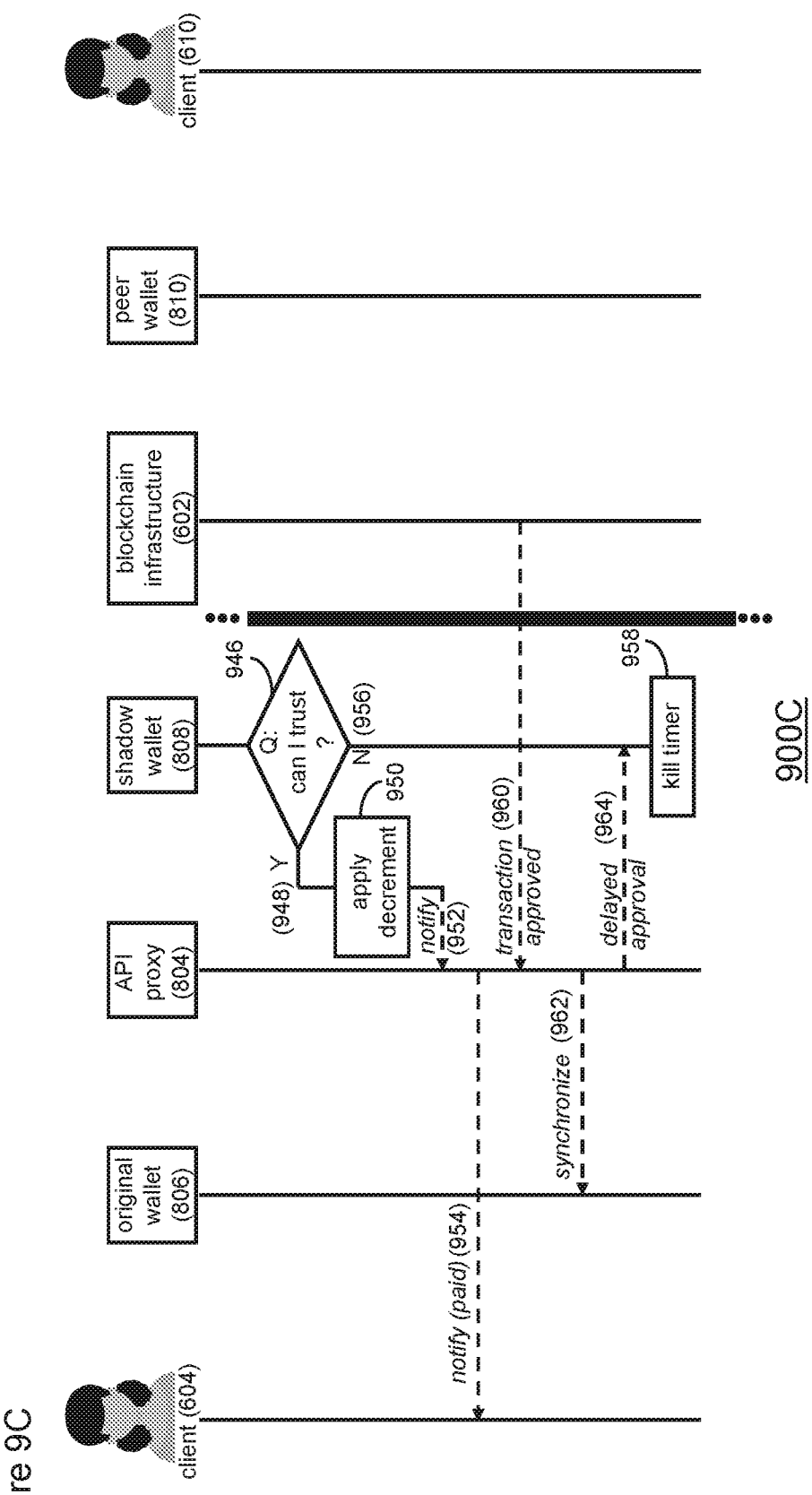
Figure 9D:
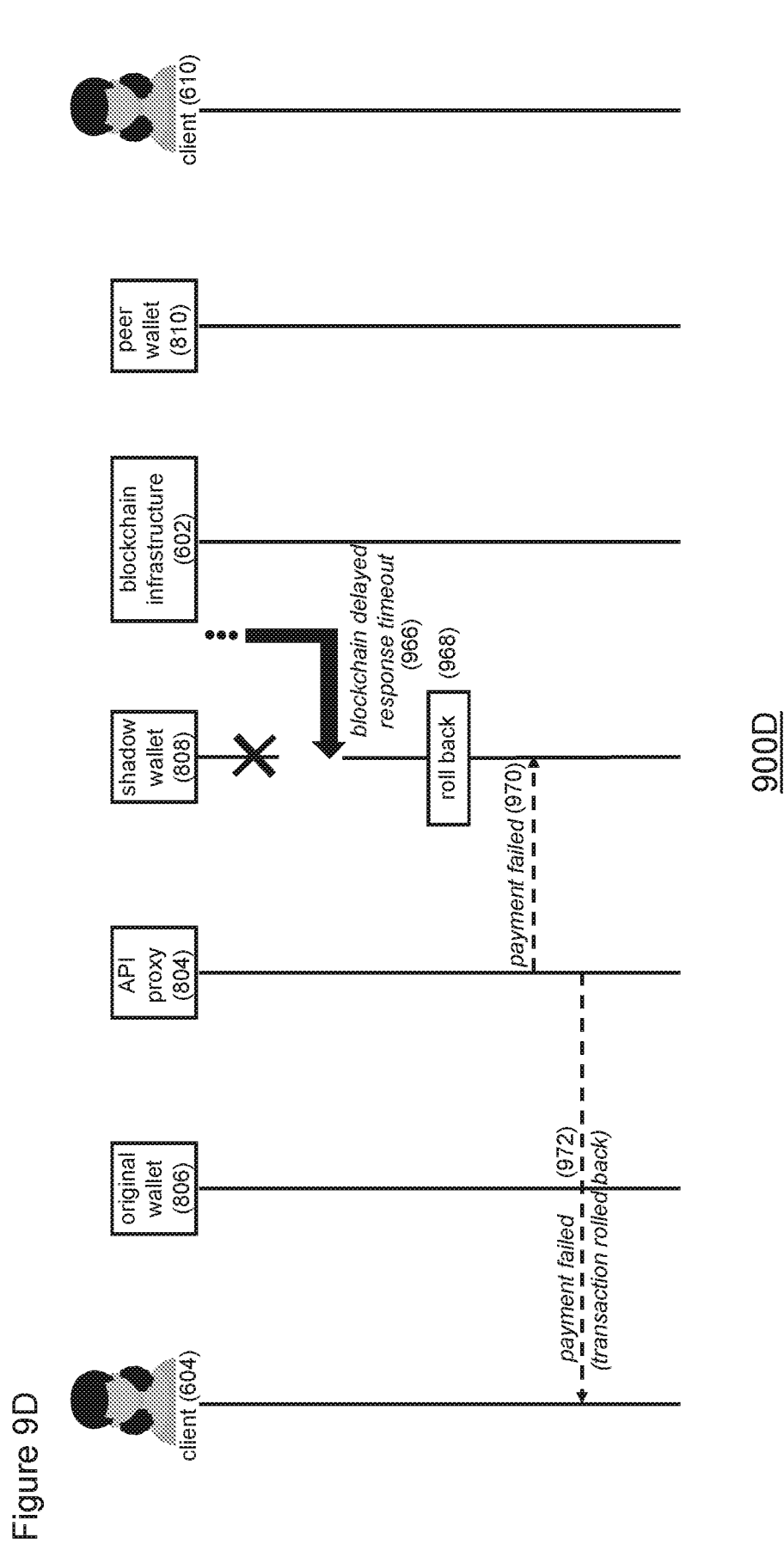

FIGS. 9A-9D provide a modified approval flow 900 of the system for reducing blockchain transaction delay 800 of FIG. 8, according to some embodiments. The approval flow is divided into four sections. In FIG. 9A, the approval flow 900A is to prepare a direct transaction initiated by the payor client 604. In FIG. 9B, the approval flow 900B is for the API proxy to interact with the peer wallet, the latter of which validates the transaction. In FIG. 9C, the approval flow 900C is for validation by the shadow wallet. In FIG. 9D, the approval flow 900D is for managing a rollback if there is a failure of the transaction.

In these flow diagrams 900A-900D (collectively, "flow diagram or approval flow 900"), numbers are used as guides for the operations taking place. However, these numbers are not intended in infer a particular order of operations, as some operations will take place in an order other than sequentially. Further, not all numbered operations will happen in all circumstances, as many of the approval flows illustrate alternative paths. The numbers are simply meant to distinguish one operation from another and to supplement and clarify the written description.

The flow diagram 900 illustrates operations to be performed by the system 800 (FIG. 8), in which the original wallet (digital asset wallet) 806 interfaces with the API proxy 804 and the trusted shadow wallet 808 interfaces with the API proxy 804 (from within the trusted execution environment of the trusted coin wallet framework 802). Further, the API proxy 804 interfaces with the blockchain infrastructure 602 and the peer trusted wallet 810, both of which are outside the TEE. The peer trusted wallet 810 may be enveloped within its own TEE, such as with the trusted coin wallet 704 in FIG. 7, or may be an original wallet, such as the bitcoin wallet 608 in FIG. 6.

In FIG. 9A, the prepare direct transaction approval flow 900A, the system 800 will validate the available amount of money in the shadow wallet 808 and create a signed message to the peer wallet 810. Alternatively, where there is not enough money, the trusted transaction will not be generated and the payor client 604 will be notified about the failure. Interaction of the blockchain infrastructure 602 to perform the original transaction validation will not happen in the latter case.

Before any transaction commences, the original wallet 806 and the shadow wallet 808 are mirror images of one another, in some embodiments, with each indicating the same amount of currency. The flow begins with the client 604 initiating a payment to the client 610 by specifying that the client will make a payment in the original wallet (902). The original wallet 806 will communicate this payment to the API proxy 804 (904), and the API proxy will communicate a pay message to the shadow wallet 808 inside the TEE (906).

Once the pay request is made, the shadow wallet 808 inquires whether there is enough money for the payment (908). If so (910), the counter 814 (FIG. 8) that indicates the amount of money in the shadow wallet 808 is locked (912). Locking the shadow wallet means that the sum is marked as spent and cannot be reused in another payment. If a new payment is commenced during the transaction in progress, the shadow wallet may approve the transaction for sums that are less than or equal to the funds existing in the wallet minus the "locked" amount. A trusted direct transaction between the original wallet 806 and the peer wallet 810 is commenced (914) and the timer 816 is started (916). In some embodiments, the timer 816 keeps track of a time period inside which original transaction validation, or verification by the blockchain infrastructure 602, is completed.

If, instead, there is not enough money for the payment in the shadow wallet, the shadow wallet 808 notifies the API proxy 804 of this (918). The API proxy 804 sends a decline message to the original wallet 806 (920), and the original wallet 806, such as by way of a GUI visible to the client 604 (see, e.g., FIG. 4), indicates to the client 604 that there is not enough money in the wallet for the transaction (922).

In FIG. 9B, the approval flow 900B involves the API proxy interacting with the peer wallet. Both sides will exchange messages informing and approving that payment is done successfully. This portion 900B of the flow diagram 900 will not initiate if there is not enough money (922) for the payment in FIG. 9A.

In FIG. 9B, the shadow wallet 808 creates a signed message intended for the peer wallet 810, indicating a payment approval (924). This is indicated by the word, payment in a box with a circle above it. The signed message is a digital signature cryptographically signed by the shadow wallet using a private key, as one example. As explained above (FIG. 8), the shadow wallet 808 makes this communication by way of the API proxy 804. The API proxy 804 sends a pay directly message to the peer wallet 810 of the client 610 (926). The API proxy 804 also sends a notify on regular pay message to the blockchain infrastructure 602 (928). (Operations 926 and 928 may, for example, be performed by the API proxy in reverse order.)

Upon receipt of the pay directly message from the API proxy 804, the peer wallet 810 validates the trust attributes of the transaction (930). The peer wallet ensures that the payment is relying on real money in possession of the payor wallet. The shadow wallet is using hardware to sign the message (using private keys generated by the dedicated TEE hardware, to prove that this is a trusted wallet ensuring the availability of currency to do the transaction. In some embodiments, the peer wallet 810, like the original wallet 806, is enveloped in a trusted execution environment to shield these interactions from access by malware or nefarious clients. From within a transaction processor inside the TEE, the peer wallet 810 queries whether the transaction is trustworthy (932). If the transaction is not trustworthy, the peer wallet 810 so informs the client 610, such as via a GUI visible to the client (940). Otherwise, the peer wallet 810 deems the transaction to be trustworthy (934) and, subsequently, the peer wallet 810 signs its approval of the transaction (936). In addition to notifying its client 610 that the transaction has been paid (938), the peer wallet 810 also informs the API proxy 804, of its signed approval, given by the approval in the box with the circle above it (942). The API proxy 804 then sends an approval message to the shadow wallet 808 (with the dot indicating that the message is digitally signed) (944). The position of the approval message over the original transaction path indicates that the original transaction is slow, relative to the quicker digital exchange between trusted peers.

Also illustrated in FIGS. 9B, 9C, and 9D is the original transaction validation performed by the blockchain infrastructure 602, illustrated by a thick black line. Once the signed approval (924) is sent by the peer wallet 810 to the API proxy, followed by an approve message 944 from the API proxy to the shadow wallet 808, the independent original transaction validation is taking place at the blockchain infrastructure 602. This independent validation is part of the original behavior of the blockchain infrastructure and is essentially a fallback validation, since, at this point, the payment has already been made from the shadow wallet and approved by the peer wallet. More about this independent verification is noted in the flow diagram of FIG. 9D, below.

In FIG. 9C, the approval flow 900C for closing the transaction commences. The operations of FIG. 9C will not occur if the peer wallet 810 determines that the transaction cannot be trusted (940) but will commence after the transaction has been approved (944).

Recall from FIG. 9A that the shadow wallet 808 initially confirmed that there was enough money. Then, in FIG. 9B, the peer wallet 810 determined whether the transaction is trustworthy. Now, in FIG. 9C, the shadow wallet 808 is also determining whether the transaction is trustworthy. This operation ensures that the original blockchain transaction processing is maintained.

The operations of FIG. 9C commence with the shadow wallet 808, after receiving the approve message from the API proxy (944), itself inquiring whether the transaction can be trusted (946). If so (948), the counter 814 tracking the money in the shadow wallet is decremented (950) and the shadow wallet so notifies the API proxy 804 (952). The API proxy 804 then sends a notify (paid) message, indicating to the client 604 that the transaction has been paid (954).

Recall that the blockchain infrastructure 602 is independently confirming the veracity of the transaction, known herein as the original transaction validation, although in a more delayed manner. Thus, FIG. 9C shows that the blockchain infrastructure 602 sends a transaction approved message to the API proxy 804 (960). The API proxy 804 then sends a synchronize message to the original wallet 806 (962), so as to synchronize the amount indicated in currency counter 814 of the trusted shadow wallet 808 with that of the original wallet 806. The API proxy 804 also sends a delayed approval message to the shadow wallet 808 (964). This indicates that the transaction is confirmed, thus, the timer is disabled (958), ensuring that no rollback of the transaction will occur.

Returning to the original query (946), if the shadow wallet 808 determines that the transaction cannot be trusted (956), the timer 816 used to track the original transaction validation operations by the blockchain infrastructure is disabled or killed (958).

In FIG. 9D, the approval flow 900D manages a rollback if there is a transaction failure, in some embodiments. This may occur, for example, when the seller/payee client 610, or, more precisely, the peer trusted wallet 810 fails to provide trusted approval (942) on acceptance of the payment (924). In this case, the shadow wallet 808 will be updated on confirmation coming from the blockchain infrastructure 602, in other words, by way of original transaction validation. In some embodiments, this update would happen before the timer 816 expires. Where, instead, the timer 816 expires before receiving original transaction validation, the transaction is rolled back and the appropriate currency amount will be returned to the shadow wallet and the client 604 will be informed of the failure.

In FIG. 9D, an X indicates that the timer, which was started in FIG. 9A (block 916), has expired. In some embodiments, the timer is set to be sufficiently long for the blockchain infrastructure to have sufficient time to approve the transaction. If a blockchain delayed response timeout occurred (966), this means that the blockchain was not able to approve the transaction within the specified time period. At this point, a rollback occurs at the shadow wallet 808 (968), with the decremented amount of the currency counter 814 being restored to its original amount. In some embodiments, the timer is managed by the shadow wallet in the TEE, and, upon expiration, triggers the rollback independently. Accordingly, the API proxy 804 sends a payment failed message to the shadow wallet 808 (970). The API proxy also notifies the client 604 of the failure via a payment failed (transaction rolled back) message to the client 604 (972).

To summarize the operations of the flow diagram 900, upon initiation of a transaction between payor/buyer client and payee/seller client, the shadow wallet in the TEE confirms that there is enough currency for the transaction, then initiates a signed transaction. The peer trusted wallet validates the transaction then approves of the transaction. The shadow wallet also validates the transaction. Interactions between the shadow wallet and the peer trusted wallet occur via the API proxy. Meanwhile, the blockchain infrastructure is performing its original transaction validation independently. If the original validation is inconsistent or times out without validation, the transaction is rolled back. Interactions between the shadow wallet and the peer trusted wallet occur via the API proxy.

Figure 10:
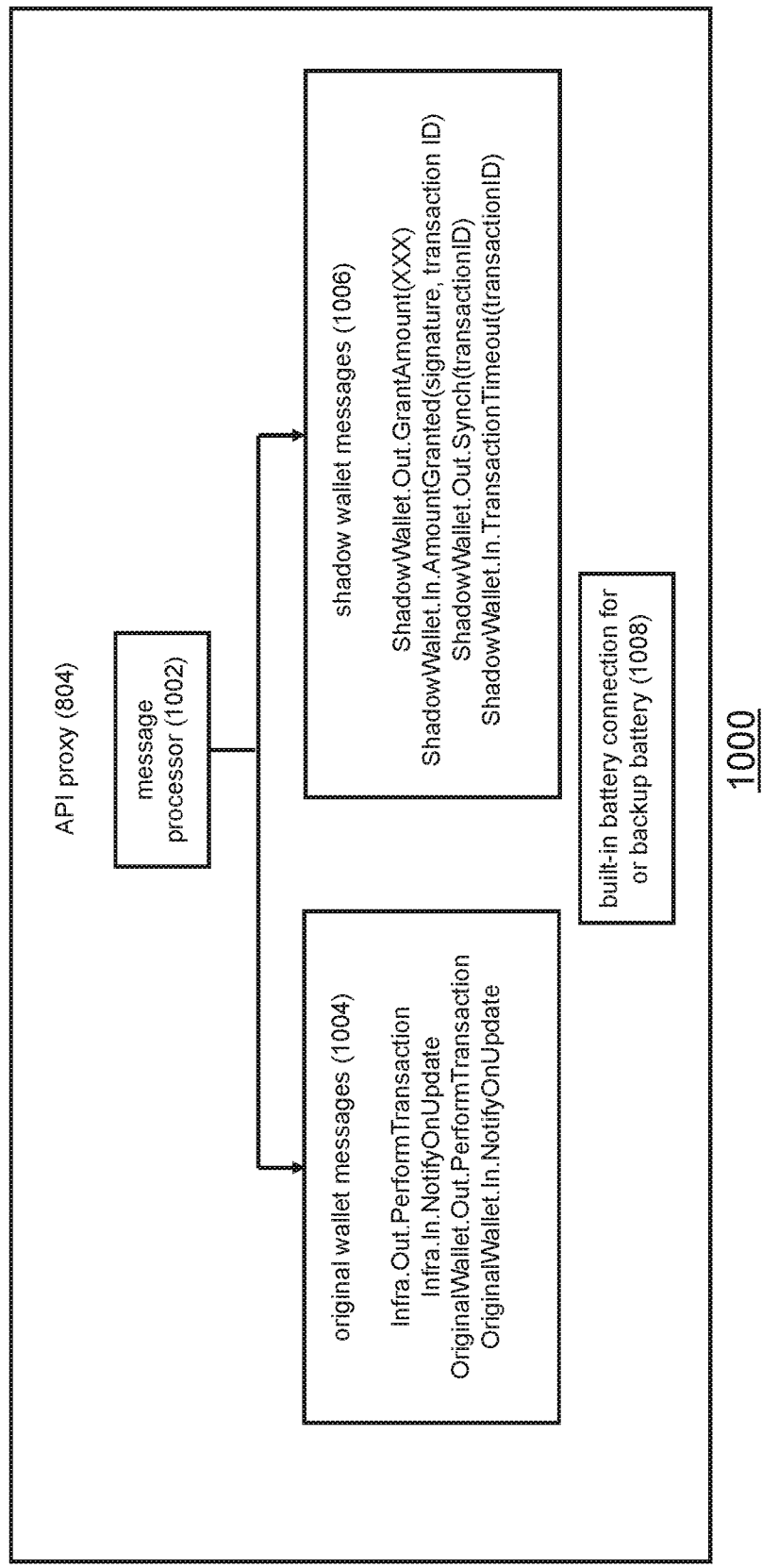
FIG. 10 is a simplified block diagram of the API proxy of FIG. 8, according to some embodiments.

FIG. 10 is a simplified block diagram of the API proxy 804 of the trusted coin wallet framework 802 (FIG. 8), according to some embodiments. The API proxy 804 includes a message processor 1002 and a memory 1004. The message processor 1002 processes the various messages sent by the API proxy 804 to the various entities of the system 800, including the blockchain infrastructure 602, the original wallet 806, the trusted shadow wallet 808, and the peer trusted wallet 810. The memory 1004 stores the various messages sent by the API proxy to these entities, as described in the flow diagram 900 (FIGS. 9A-9D). Original wallet messages 1004 and shadow wallet messages 1006 are shown. The "In" and "Out" message directions are specified from the point of view of the API proxy (FIG. 8). In some embodiments, the API proxy is run inside the TEE and is protected against power failure, such as by having built-in or backup batteries (1008).

Figure 11:
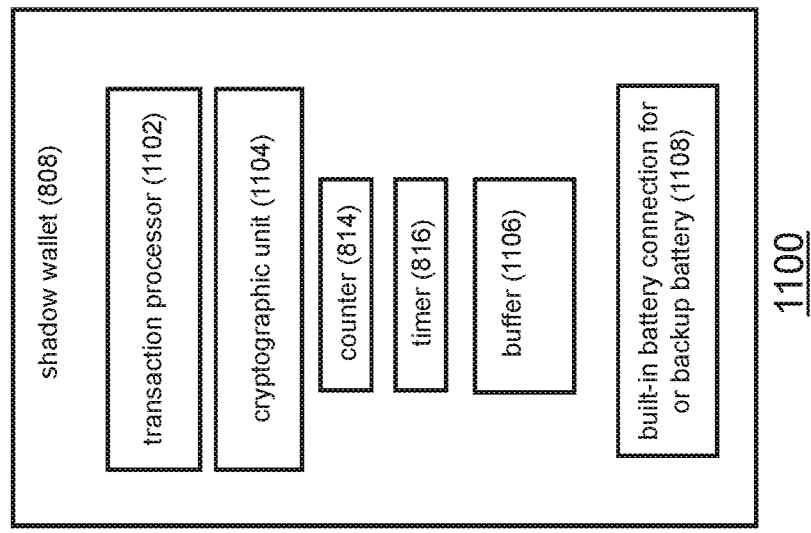
FIG. 11 is a simplified block diagram of the trusted shadow wallet of the trusted coin wallet framework of FIG. 8, according to some embodiments.

FIG. 11 is a simplified block diagram of the trusted shadow wallet 808 of the trusted coin wallet framework 802 (FIG. 8), according to some embodiments. In addition to the currency counter 814 and original transaction validation timer 816 introduced above, the shadow wallet also includes a transaction processor 1102 for performing operations of the flow diagram 900 above, including but not limited to determining if the wallet has enough money (908), incrementing and decrementing the counter 814 (912 and 950), creating a trusted direct transaction (914), starting and stopping the timer (916 and 958), creating a signed payment message (924), and determining whether the transaction is to be trusted (946). In some embodiments, the shadow wallet 808 includes a separate cryptographic unit 1104 where digital signatures are part of these operations. A buffer (1106) enables storage of notifications in case a main host is down due to critical event occurrence. As with the API proxy, the shadow wallet runs inside the TEE and is protected against power failure (1108).

Figure 12:
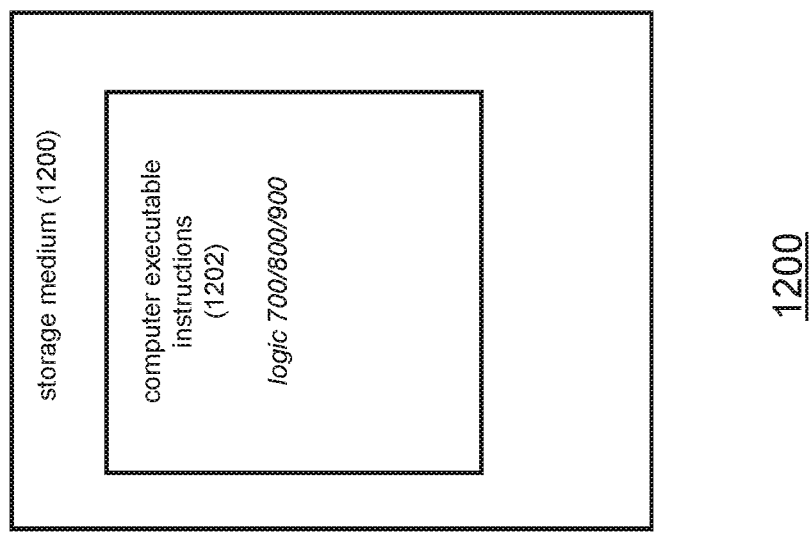
FIG. 12 is a simplified block diagram of a storage medium to implement the method of FIG. 7 or the system of FIG. 8, according to some embodiments.

FIG. 12 illustrates an embodiment of a storage medium 1200. The storage medium 1200 may comprise an article of manufacture. In some examples, the storage medium 1200 may include any non-transitory computer readable medium or machine readable medium, such as an optical, magnetic or semiconductor storage. The storage medium 1200 may store various types of computer executable instructions e.g., 1202). The storage medium 1200 may store various types of computer executable instructions to implement technique 700. The storage medium 1200 may store various types of computer executable instructions to implement technique 800. The storage medium 1200 may store various types of computer executable instructions to implement logic flow 900.

Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 13:
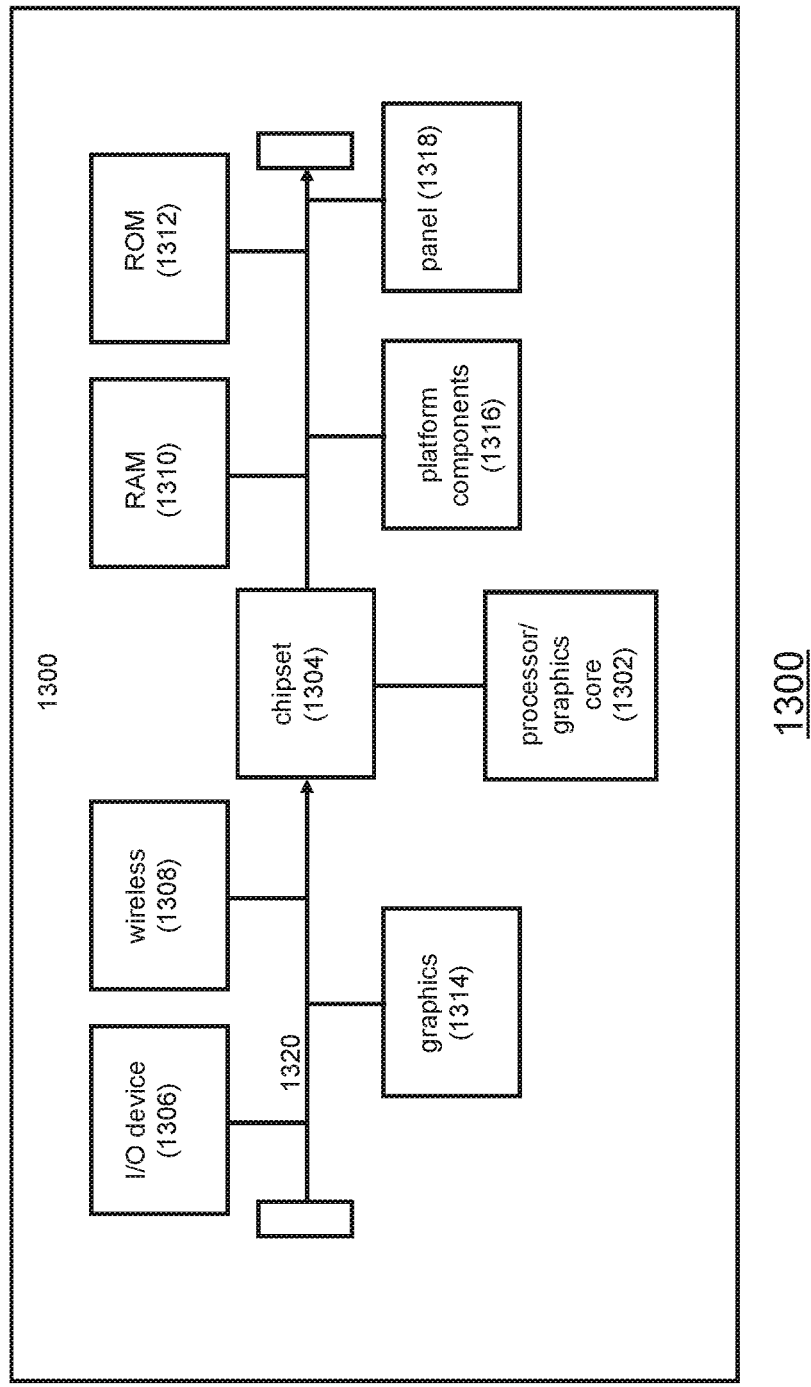
FIG. 13 is a simplified block diagram of a device to implement the method of FIG. 7 or the system of FIG. 8, according to some embodiments.

FIG. 13 is a diagram of an exemplary system embodiment and, depicts a platform 1300, which may include various elements. For instance, this figure depicts that platform (system) 1300 may include a processor/graphics core 1302, a chipset 1304, an input/output (I/O) device 1306, a random-access memory (RAM) (such as dynamic RAM (DRAM)) 1310, and a read only memory (ROM) 1312, panel 1318 and various other platform components 1316 (e.g., a fan, a cross flow blower, a heat sink, cooling system, housing, vents, and so forth). System 1300 may also include wireless communications chip 1308 and graphics device 1314. The embodiments, however, are not limited to these elements.

As depicted, I/O device 1306, RAM 1310, and ROM 1312 are coupled to processor 1302 by way of chipset 1304. Chipset 1304 may be coupled to processor 1302 by a bus 1320. Accordingly, bus 1320 may include multiple lines.

Processor 1302 may be a central processing unit comprising one or more processor cores and may include any number of processors having any number of processor cores. The processor 1302 may include any type of processing unit, such as, for example, CPU, multi-processing unit, a reduced instruction set computer (RISC), a processor that has a pipeline, a complex instruction set computer (CISC), digital signal processor (DSP), and so forth. In some embodiments, processor 1302 may be multiple separate processors located on separate integrated circuit chips. In some embodiments processor 1302 may be a processor having integrated graphics, while in other embodiments processor 1302 may be a graphics core or cores.

In summary, the method and system for reducing blockchain transaction delay may be implemented in a first example by an apparatus comprising a trusted execution environment comprising a processor and memory coupled to the processor, the memory comprising instructions that when executed by the processor cause the processor to create a trusted direct transaction from a shadow wallet for a digital asset, the shadow wallet associated with a digital asset wallet for a blockchain infrastructure, send an indication of the trusted direct transaction to a peer, mirror, via an application programming interface (API) proxy for the digital asset wallet, the trusted direct transaction in the digital asset wallet, and transfer a digital asset between the digital asset wallet and a wallet associated with the peer before independent validation of the trusted directed transaction is made by the blockchain infrastructure.

Further to the first example or any other example discussed herein, in a second example, the apparatus comprises instructions further causing the processor to receive an indication from the peer that the trusted direct transaction is accepted by the peer, and verify the trusted direct transaction responsive to receiving the indication from the peer.

Further to the second example or any other example discussed herein, in a third example, the shadow wallet of the apparatus further comprises a timer to track a time period inside of which the trusted direct transaction is to be completed.

Further to the first example or any other example discussed herein, in a fourth example, the shadow wallet of the apparatus further comprises a cryptographic unit for generating a signed payment to the API proxy.

The method and system for reducing blockchain transaction delay may be implemented in a fifth example by an apparatus comprising a trusted execution environment comprising a processor, and memory coupled to the processor, the memory comprising instructions that when executed by the processor cause the processor to receive, by a peer, an indication of a trusted direct transaction from a shadow wallet for a digital asset from a client, wherein the shadow wallet is associated with a digital asset wallet for a blockchain infrastructure, send, by the peer, an indication to the client that the trusted direct transaction is accepted, verify, by the peer, the trusted direct transaction, wherein the trusted direct transaction in the digital asset wallet is mirrored, via an application programming interface (API) proxy of the client, wherein a digital asset is transferred between the digital asset wallet and a wallet associated with the peer before independent validation of the trusted directed transaction is made by the blockchain infrastructure.

Further to the fifth example or any other example discussed herein, in a sixth example, the peer of the apparatus further signs approval for the trusted direct transaction.

Further to the sixth example or any other example discussed herein, in a seventh example, the peer of the apparatus further sends the signed approval to the shadow wallet of the client.

The method and system for reducing blockchain transaction delay may be implemented in an eighth example by at least one machine-readable storage medium comprising instructions that, when executed by a processor, cause the processor to create, by a shadow wallet, a trusted direct transaction, the shadow wallet to mirror an original wallet controlled by a client, wherein the shadow wallet is disposed inside a trusted execution environment (TEE) and communication between the shadow wallet and the original wallet occurs through an application programming interface (API) proxy, wherein the API proxy is also inside the TEE, verify the trusted direct transaction by the shadow wallet, after having received an approval of the trusted direct transaction by a peer wallet belonging to a second client, and transfer a digital currency between the original wallet and the peer wallet before independent validation of the trusted directed transaction is made by a blockchain infrastructure accessible to the API proxy.

Further to the eighth example or any other example discussed herein, in a ninth example, the at least one machine-readable storage medium comprises instructions that further cause the processor to lock a currency counter once the shadow wallet confirms that the original wallet has enough currency to support the trusted direct transaction.

Further to the eighth example or any other example discussed herein, in a tenth example, the at least one machine-readable storage medium comprises instructions that further cause the processor to start a timer to track a time period inside of which original transaction validation by the blockchain infrastructure is to be completed.

Further to the tenth example or any other example discussed herein, in an eleventh example, the at least one machine-readable storage medium comprises instructions that further stop the timer in response to determining that the trusted direct transaction is not trustworthy.

Further to the tenth example or any other example discussed herein, in a twelfth example, the at least one machine-readable storage medium comprises instructions that further roll back the trusted direct transaction in response to failure of original transaction validation by the blockchain infrastructure.

Further to the eighth example or any other example discussed herein, in a thirteenth example, the at least one machine-readable storage medium comprises instructions that further decrement the currency counter once the shadow wallet trusts the trusted direct transaction.

Further to the eighth example or any other example discussed herein, in a fourteenth example, the at least one machine-readable storage medium comprises instructions that further notify the API proxy once the shadow wallet determines that there is not enough digital currency to complete the trusted direct transaction, the API proxy to send a decline message to the original wallet.

The method and system for reducing blockchain transaction delay may be implemented in a sixteenth example by at least one machine-readable storage medium comprising instructions that, when executed by a processor, cause the processor to receive, by a peer, a trusted direct transaction from a shadow wallet of a client, the shadow wallet to mirror an original wallet controlled by the client, wherein the shadow wallet is disposed inside a trusted execution environment (TEE) and communication between the shadow wallet and the original wallet occurs through an application programming interface (API) proxy, wherein the API proxy is also inside the TEE and approve the trusted direct transaction to be subsequently verified by the shadow wallet of the client, wherein a digital currency is transferred to a peer wallet before independent validation of the trusted directed transaction is made by a blockchain infrastructure accessible to the API proxy.

Further to the sixteenth example or any other example discussed herein, in a seventeenth example, the at least one machine-readable storage medium comprises instructions that further signs approval for the trusted direct transaction.

Further to the sixteenth example or any other example discussed herein, in an eighteenth example, the at least one machine-readable storage medium comprises instructions that further sends the signed approval to the shadow wallet of the client.

The method and system for reducing blockchain transaction delay may be implemented in a nineteenth example by an application programming interface (API) proxy, operating inside a trusted execution environment (TEE), the API proxy to interface with a wallet of a client, the wallet to enable the client to engage in a digital currency transaction, wherein the API proxy further sends a transaction request to a blockchain infrastructure for original validation of the digital currency transaction, communicates with a shadow wallet disposed inside the TEE, the shadow wallet to digitally sign the digital currency transaction after confirming that the wallet has enough currency to support the digital currency transaction, and communicates with a peer wallet of a second client on behalf of the shadow wallet, the peer wallet to enable the second client to engage in the digital currency transaction with the client, wherein the API proxy facilitates approval of the digital currency transaction before original validation of the digital currency transaction by the blockchain infrastructure occurs.

Further to the nineteenth example or any other example discussed herein, in a twentieth example, the API proxy further comprising a message processor to enable transmission of messages to the wallet and the shadow wallet.

The method and system for reducing blockchain transaction delay may be implemented in a twenty-first example by a method comprising creating, by a shadow wallet, a trusted direct transaction, the shadow wallet to mirror an original wallet controlled by a client, wherein the shadow wallet is disposed inside a trusted execution environment (TEE) and communication between the shadow wallet and the original wallet occurs through an application programming interface (API) proxy, wherein the API proxy is also inside the TEE, verifying the trusted direct transaction by the shadow wallet, after having received an approval of the trusted direct transaction by a peer wallet belonging to a second client, and transferring a digital currency between the original wallet and the peer wallet before independent validation of the trusted directed transaction is made by a blockchain infrastructure accessible to the API proxy.

Further to the twenty-first example or any other example discussed herein, in a twenty-second example, the method further comprises locking a currency counter once the shadow wallet confirms that the original wallet has enough currency to support the trusted direct transaction.

Further to the twenty-first example or any other example discussed herein, in a twenty-third example, the method further comprises starting a timer to track a time period inside of which original transaction validation by the blockchain infrastructure is to be completed.

Further to the twenty-third example or any other example discussed herein, in an twenty-fourth example, the method further comprises stopping the timer in response to determining that the trusted direct transaction is not trustworthy.

Further to the twenty-third example or any other example discussed herein, in a twenty-fifth example, the method further comprises rolling back the trusted direct transaction in response to failure of original transaction validation by the blockchain infrastructure.

Further to the eighth example or any other example discussed herein, in a twenty-sixth example, the method further comprises decrementing the currency counter once the shadow wallet trusts the trusted direct transaction.

Further to the twenty-first example or any other example discussed herein, in a twenty-seventh example, the method further comprises notifying the API proxy once the shadow wallet determines that there is not enough digital currency to complete the trusted direct transaction, the API proxy to send a decline message to the original wallet.

The method and system for reducing blockchain transaction delay may be implemented in a twenty-eighth example by a method comprising receiving, by a peer, a trusted direct transaction from a shadow wallet of a client, the shadow wallet to mirror an original wallet controlled by the client, wherein the shadow wallet is disposed inside a trusted execution environment (TEE) and communication between the shadow wallet and the original wallet occurs through an application programming interface (API) proxy, wherein the API proxy is also inside the TEE and approving the trusted direct transaction to be subsequently verified by the shadow wallet of the client, wherein a digital currency is transferred to a peer wallet before independent validation of the trusted directed transaction is made by a blockchain infrastructure accessible to the API proxy.

Further to the twenty-eighth example or any other example discussed herein, in a twenty-ninth example, the method further comprises signing approval for the trusted direct transaction.

Further to the twenty-eighth example or any other example discussed herein, in a thirtieth example, the method further comprises sending the signed approval to the shadow wallet of the client.

The method and system for reducing blockchain transaction delay may be implemented in a twenty-ninth example by at least one machine-readable storage medium comprising instructions that, when executed by a processor, to implement a method or realize an apparatus as claimed in any preceding claim.

Some embodiments may be described using the expression "one embodiment" or "an embodiment" along with their derivatives. These terms mean that a feature, structure, or characteristic described relating to the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

We claim:

1. An apparatus, comprising:
a trusted execution environment comprising:
   a processor of a trusted execution environment (TEE); and
   memory of the TEE coupled to the processor, the memory comprising instructions that when executed by the processor cause the processor to:
     create a trusted direct transaction from a shadow wallet for a digital asset, the shadow wallet associated with a digital asset wallet for a blockchain infrastructure, wherein the shadow wallet is stored in the memory of the TEE and the digital asset wallet is stored outside of the memory of the TEE;
     generating a signed message for the trusted direct transaction, the signed message cryptographically signed by the shadow wallet using a private key for the shadow wallet, the private key generated by the TEE;
     send the signed message as an indication of the trusted direct transaction to a peer;
     mirror, via an application programming interface (API) proxy for the digital asset wallet, the trusted direct transaction in the digital asset wallet; and
     transfer a digital asset between the digital asset wallet and a wallet associated with the peer before independent validation of the trusted directed transaction is made by the blockchain infrastructure.

2. The apparatus of claim 1, the instructions further cause the processor to:
receive an indication from the peer that the trusted direct transaction is accepted by the peer; and
verify the trusted direct transaction responsive to receiving the indication from the peer.

3. The apparatus of claim 2, the shadow wallet further comprising a timer to track a time period inside of which the trusted direct transaction is to be completed.

4. The apparatus of claim 1, the shadow wallet further comprising a cryptographic unit for generating a signed payment to the API proxy.

\* \* \* \* \*